US009194496B2

(12) United States Patent
Pecak (10) Patent No.: US 9,194,496 B2
(45) Date of Patent: Nov. 24, 2015

(54) SEAL WITH PRESSURE-ACTUATABLE SEALING BEAD (75) Inventor: Robert D. Pecak, Naperville, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 217 days.

(21) Appl. No.: 13/817,073

(22) PCT Filed: Aug. 18, 2011

(86) PCT No.: PCT/US2011/048207
§ 371 (c)(1),
(2), (4) Date: Feb. 14, 2013

(87) PCT Pub. No.: WO2012/024470
PCT Pub. Date: Feb. 23, 2012

(65) Prior Publication Data
US 2013/0140127 A1 Jun. 6, 2013

Related U.S. Application Data (60) Provisional application No. 61/374,873, filed on Aug. 18, 2010.

(51) Int. Cl.
*F16D 25/06* (2006.01)
*F16J 15/32* (2006.01)
(Continued)

(52) U.S. Cl.
CPC ............... *F16J 15/32* (2013.01); *F16D 25/06* (2013.01); *F16D 25/0638* (2013.01); *F16J 15/164* (2013.01); *F16J 15/56* (2013.01); *F16D 2048/0212* (2013.01); *F16D 2300/08* (2013.01)

(58) Field of Classification Search
CPC ... F16D 25/0638; F16D 25/12; F16D 25/123; F16D 2048/0212; F16D 2300/08; F16J 15/32; F16J 15/3204; F16J 15/3216; F16J 15/322; F16J 15/3232; F16J 15/3236; F16J 15/164; F16J 15/54
See application file for complete search history.

(56) References Cited

U.S. PATENT DOCUMENTS 4,053,166 A * 10/1977 Domkowski ............... 277/562
5,287,951 A * 2/1994 Voit et al. ............... 192/85.54
(Continued)

OTHER PUBLICATIONS

Blaine R. Copenhaver, PCT International Search Report, Jan. 20, 2012.
(Continued)

*Primary Examiner* — Jacob S Scott
(74) *Attorney, Agent, or Firm* — Mark Ussai; SKF USA Inc. Patent Dept.

(57) ABSTRACT

A seal assembly includes an annular body coupled with an inner member or an outer member and has inner and outer circumferential surfaces and first and second annular sealing portions spaced along a centerline. The two sealing portions either extend radially outwardly from the outer surface and have an outside diameter, with the first portion diameter being greater than the second portion diameter, or extend radially inwardly from the body inner surface and have an inside diameter, with the first portion diameter being lesser than the second portion diameter. The seal body is radially deflectable such that the first sealing portion is engaged with one of the outer and inner members, and the second sealing portion is spaced from the member, when the body is exposed to pressure lesser than a predetermined value and both sealing portions are engaged with the member at pressures above the value.

19 Claims, 9 Drawing Sheets (51) Int. Cl.
  *F16D 25/0638* (2006.01)
  *F16J 15/16* (2006.01)
  *F16J 15/56* (2006.01)
  *F16D 48/02* (2006.01)

(56) References Cited

U.S. PATENT DOCUMENTS

| | | | | |
|---|---|---|---|---|
| 5,865,442 A | * | 2/1999 | Iwashita | 277/560 |
| 5,899,461 A | * | 5/1999 | Yomogita | 277/559 |
| 6,039,160 A | | 3/2000 | Joppeck | |
| 6,209,882 B1 | * | 4/2001 | Riess | 277/562 |
| 6,957,605 B1 | * | 10/2005 | Blume | 277/560 |
| 7,647,864 B2 | | 1/2010 | Watanabe | |
| 2007/0251380 A1 | | 11/2007 | Kanzaki | |
| 2009/0282972 A1 | * | 11/2009 | Schmidt | 92/248 |
| 2010/0025937 A1 | * | 2/2010 | Morishita et al. | 277/549 |

OTHER PUBLICATIONS

Yaogang Xu, First Office Action and Search Report from Chinese Patent Office, Nov. 4, 2014.

* cited by examiner

FIG. 12

SEAL WITH PRESSURE-ACTUATABLE SEALING BEAD

BACKGROUND OF THE INVENTION

The present invention relates to seals, and more particularly to seals for actuator piston assemblies.

Actuator assemblies for mechanisms such as clutches are generally known and often include a piston coupled with an input member (e.g., an input shaft) and a means for displacing the piston, such as a hydraulic working fluid, a solenoid, etc. Typically, the piston linearly displaces along an axis to engage or disengage a clutching mechanism that operatively couples the input member with an output member. When the piston is driven by hydraulic pressure, one or more seals are required to retain the hydraulic fluid (e.g., automatic transmission fluid) within one or more pressure chambers used to drive the piston.

SUMMARY OF THE INVENTION

In one aspect, the present invention is a seal assembly for sealing a space between an inner member and an outer member disposed generally coaxially about a central axis, the outer member having an inner surface and the inner member having an outer surface, at least one of the two members being linearly displaceable relative to the other member generally along the axis. The seal assembly comprises a generally annular body with a centerline, the body being coupled with one of the inner and outer members and disposed at least partially between the two members such that the centerline is generally collinear with the axis, the body having inner and outer circumferential surfaces extending about the centerline and first and second generally annular sealing portions spaced apart generally along and extending circumferentially about the centerline. In certain constructions, the two sealing portions extend generally radially outwardly from the body outer surface and each have an outside diameter, the first portion outside diameter being greater than the second portion, outside diameter, and the seal body is configured to radially deflect such that the first sealing portion is sealingly engaged with the outer member inner surface and the second sealing portion is spaced radially inwardly from the outer member inner surface when the body is exposed to pressure lesser than a predetermined value and both the first and second sealing portions are sealingly engaged with the outer member inner surface when the body is exposed to pressure of at least the predetermined value. In other constructions, the two sealing portions extend generally radially inwardly from the body inner surface and each have an inside diameter, the first portion inside diameter being lesser than the second portion inside diameter, and the seal body is configured to radially deflect such that the first sealing portion is sealingly engaged with the inner member outer surface and the second sealing portion is spaced radially outwardly from the inner member outer surface when the annular body is exposed to pressure lesser than a predetermined value and both the first and second sealing portions are sealingly engaged with the inner member outer inner surface when the body is exposed to pressure of at least the predetermined value.

In another aspect, the present invention is actuator assembly comprising inner and outer members disposed coaxially about a central axis such that a clearance space is defined between the two members, one of the inner and outer members being a clutch actuator piston linearly displaceable generally along the axis relative to the other one of the inner and outer members, and a seal assembly as described above for sealing the clearance space.

In a further aspect, the present invention is a seal assembly for sealing a space between an inner member and an outer member disposed generally coaxially about a central axis, the outer member having an inner surface and the inner member having an outer surface, at least one of the two members being linearly displaceable relative to the other member generally along the axis. The seal assembly comprises a generally annular body with a centerline, the body being coupled with one of the inner and outer members and disposed at least partially between the two members such that the centerline is generally collinear with the axis. The body has inner and outer circumferential surfaces extending about the centerline and first and second generally annular sealing portions spaced apart generally along and extending circumferentially about the centerline. The two sealing portions extend generally radially outwardly from the body outer surface and each have an outside diameter, the first portion outside diameter being greater than the second portion outside diameter. The seal body is configured to radially deflect such that the first sealing portion is sealingly engaged with the outer member inner surface and the second sealing portion is spaced radially inwardly from the outer member inner surface when the body is exposed to pressure lesser than a predetermined value and both the first and second sealing portions are sealingly engaged with the outer member inner surface when the body is exposed to pressure of at least the predetermined value.

In yet another aspect, the present invention is a seal assembly for sealing a space between an inner member and an outer member disposed generally coaxially about a central axis, the outer member having an inner surface and the inner member having an outer surface, at least one of the two members being linearly displaceable relative to the other member generally along the axis. The seal assembly comprises a generally annular body with a centerline, the body being coupled with one of the inner and outer members and disposed at least partially between the two members such that the centerline is generally collinear with the axis. The body has inner and outer circumferential surfaces extending about the centerline and first and second generally annular sealing portions spaced apart generally along and extending circumferentially about the centerline. The two sealing portions extend generally radially inwardly from the body inner surface and each have an inside diameter, the first portion inside diameter being lesser than the second portion inside diameter. The seal body is configured to radially deflect such that the first sealing portion is sealingly engaged with the inner member outer surface and the second sealing portion is spaced radially outwardly from the inner member outer surface when the annular body is exposed to pressure lesser than a predetermined value and both the first and second sealing portions are sealingly engaged with the inner member outer inner surface when the body is exposed to pressure of at least the predetermined value.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 7A and 7B, collectively FIG. 7, are each a separate view of representing both of the first and third seals, FIG. 7A showing the first/third seal in a lower pressure situation and FIG. 7B showing the first/third seal in a higher pressure situation;

FIGS. 8A and 8B, collectively FIG. 8, are each a separate view of representing the second seal, FIG. 8A showing the second seal in a lower pressure situation and FIG. 7B showing the second seal in a higher pressure situation;

DETAILED DESCRIPTION OF THE INVENTION

Certain terminology is used in the following description for convenience only and is not limiting. For example, the words "connected" or "coupled" are each intended to include direct connections between two members without any other members interposed therebetween and indirect connections between members in which one or more other members are interposed therebetween. The terminology includes the words specifically mentioned herein, derivatives thereof, and words of similar import.

Referring now to the drawings in detail, wherein like numbers are used to indicate like elements throughout, there is shown in FIGS. 1-12 a seal 10 for sealing a clearance space $S_C$ between an outer member 1 and an inner member 2, the two members 1, 2 preferably forming part of an clutch actuator assembly 3 as described below. The two members 1, 2 are disposed generally coaxially about a central axis $A_C$, the outer member 1 having an inner surface 1a and the inner member 2 having an outer surface 2a, and at least one of the two members 1, 2 being linearly displaceable relative to the other member 2, 1 generally along the axis $A_C$. The seal 10 basically comprises a generally annular seal body 12 with a centerline 13, the body 12 being coupled with one of the outer and inner members 1, 2 and disposed at least partially between the two members 1, 2 such that the centerline 13 is generally collinear with the axis $A_C$. The seal body 12 has inner and outer circumferential surfaces 14, 15, respectively, extending about the centerline 13 and first and second generally annular sealing portions 16, 18, respectively, spaced axially apart generally along, and extending circumferentially about, the centerline 13.

Figure 4:
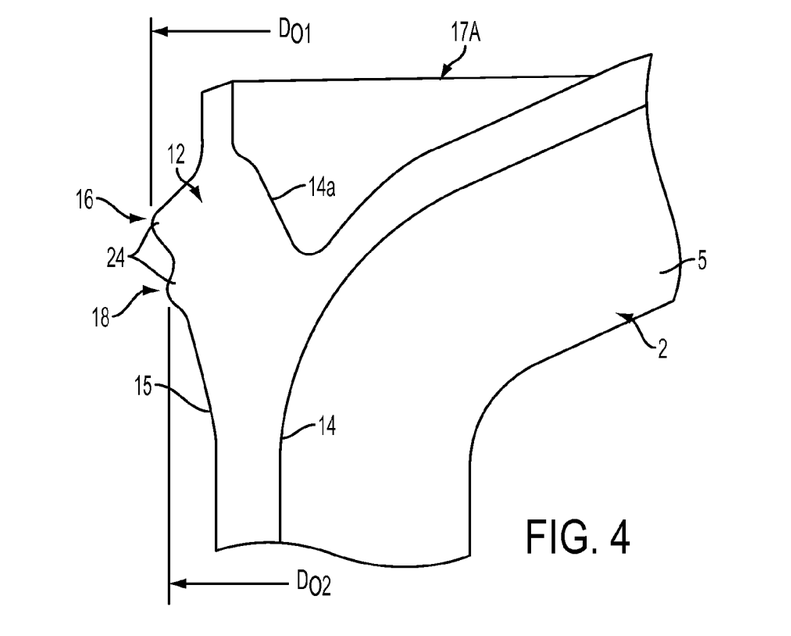
FIG. 4 is a broken-away, greatly enlarged view of a portion of FIG. 2, showing the first seal in an undeflected state.
Figure 6:
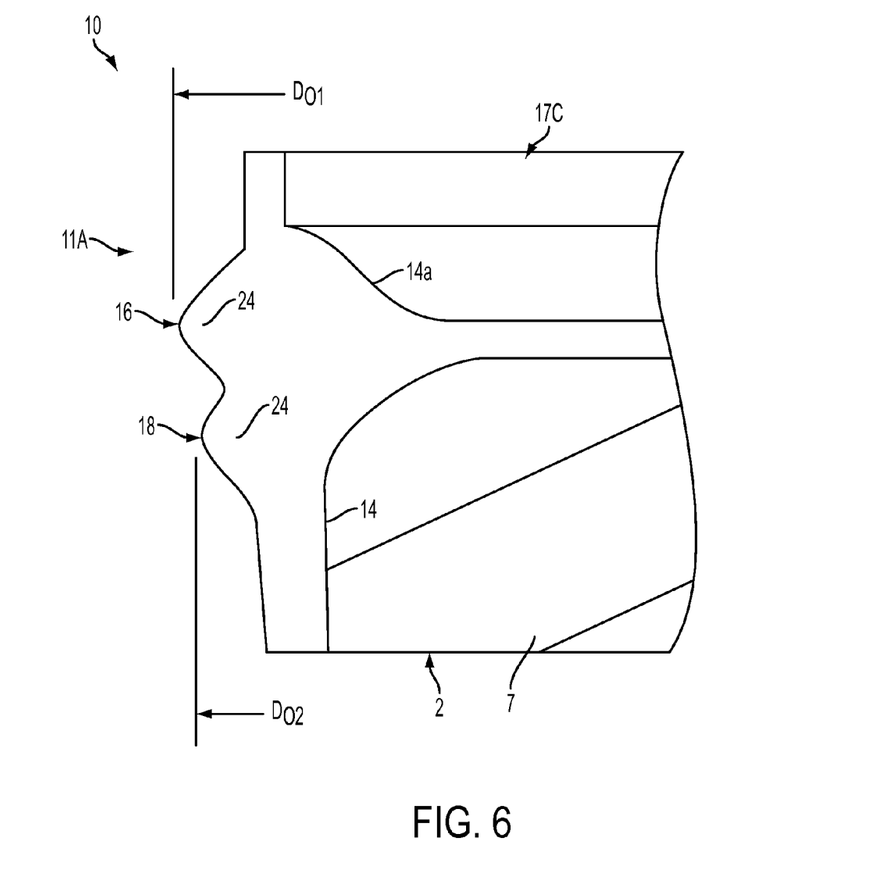
FIG. 6 is a broken-away, greatly enlarged view of a portion of FIG. 3, showing the third seal in an undeflected state.
Figure 7A:
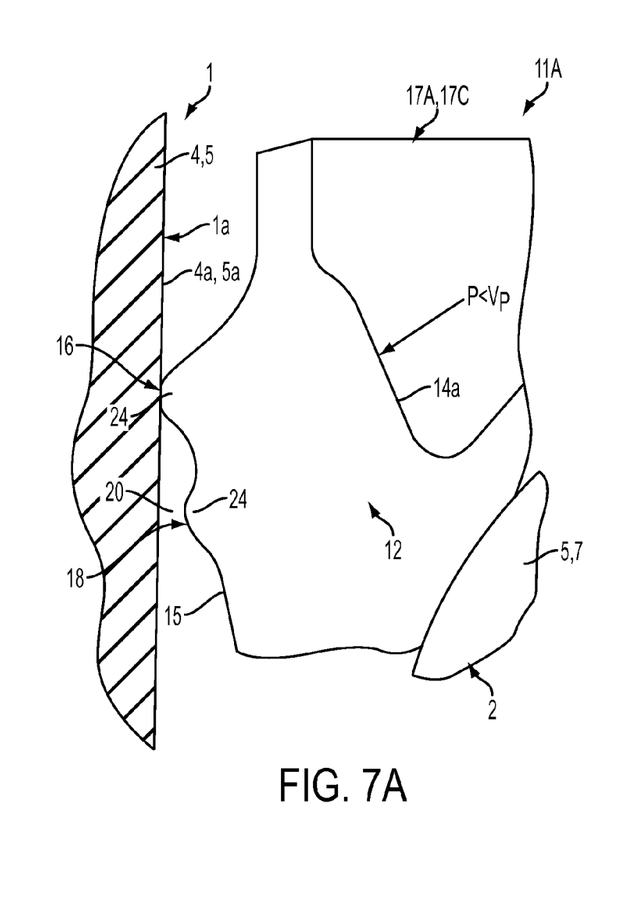
Figure 7B:
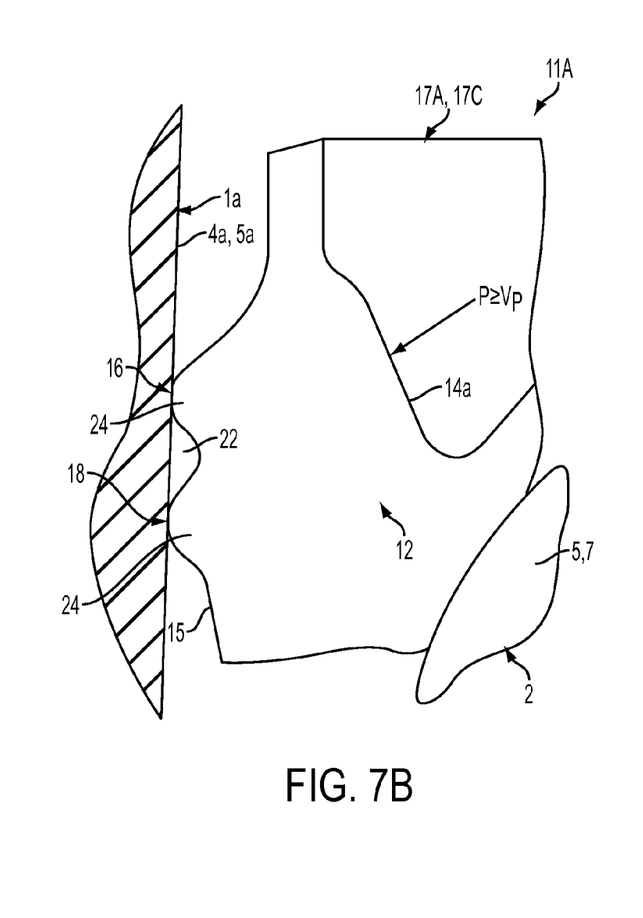

In a first construction shown in FIGS. 4, 6 and 7, the seal 10 is formed as an outer seal 11A having the first and second sealing portions 16, 18 extending generally radially outwardly from the body outer surface 15 and each having an outside diameter $D_{O1}$, $D_{O2}$, the first portion outside diameter $D_{O1}$ being greater than the second portion outside diameter $D_{O2}$. Further, the seal body 12 is configured to radially deflect such that, when the body 12 is exposed to pressure P less than a predetermined value $V_P$ (e.g., 20 psi), only the first sealing portion 16 is "sealingly engaged" (i.e., in contact so as to form a seal) with the outer member inner surface 1a and the second sealing portion 18 is spaced radially inwardly from the outer member inner surface 1a, as depicted in FIG. 7A. However, when the seal body 12 is exposed to pressure P of at least the predetermined value $V_P$, the body 12 radially deflects outwardly such that both the first and second sealing portions 16, 18 are sealingly engaged with the outer member inner surface 1a. More specifically, pressure P applied to a drive surface section 14a of the inner circumferential surface 14 causes the seal body 12 to deflect radially outwardly, when equal to or greater than the predetermined value $V_P$, thereby moving the second sealing portion 18 radially into engagement with the outer member inner surface 1a, as best show in FIG. 7B.

Thus, the first sealing portion 16 is generally radially "fixed" and constantly engaged with the surface 1a (although slidable axially against the surface 1a) and the second sealing portion 18 is generally radially "movable" so as to be adjustably or selectively engageable with the surface 1a. That is, the movable sealing portion 18 is "pressure actuatable" so as to only be sealingly engaged at relatively higher pressure conditions and disengaged at lower pressure conditions. In the preferred clutch actuator application, the predetermined pressure value $V_P$ is preferably within the range of about fifteen pounds per square inch (15 psi) and twenty-five pounds per square inch (25 psi), for reasons described below. However, the seal body 12 may be configured to radially deflect to engage the second, movable sealing portion 18 at any appropriate pressure value as required by the particular application of the seal 10.

Figure 5:
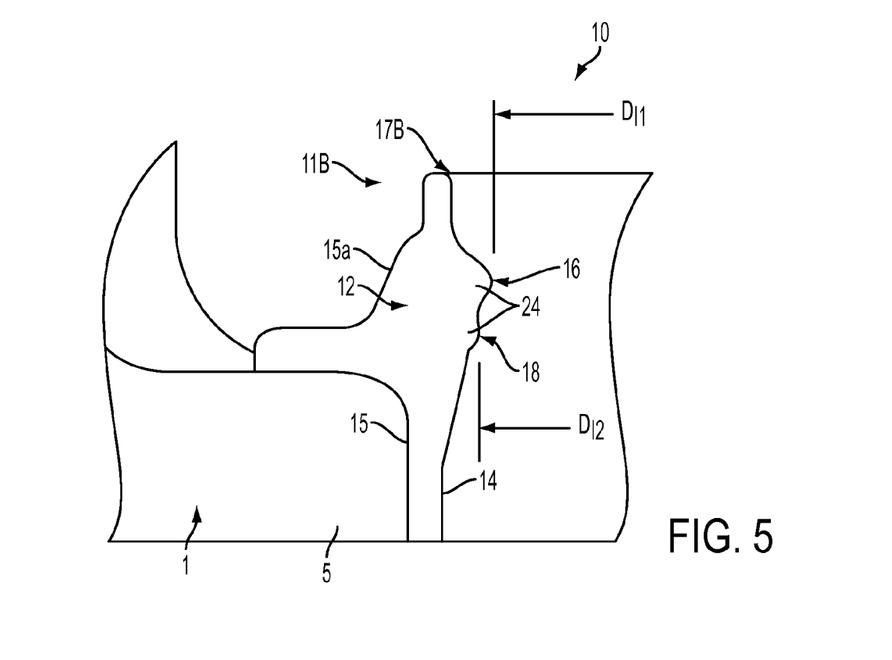
FIG. 5 is a broken-away, greatly enlarged view of another portion of FIG. 2, showing the second seal in an undeflected state.
Figure 8A:
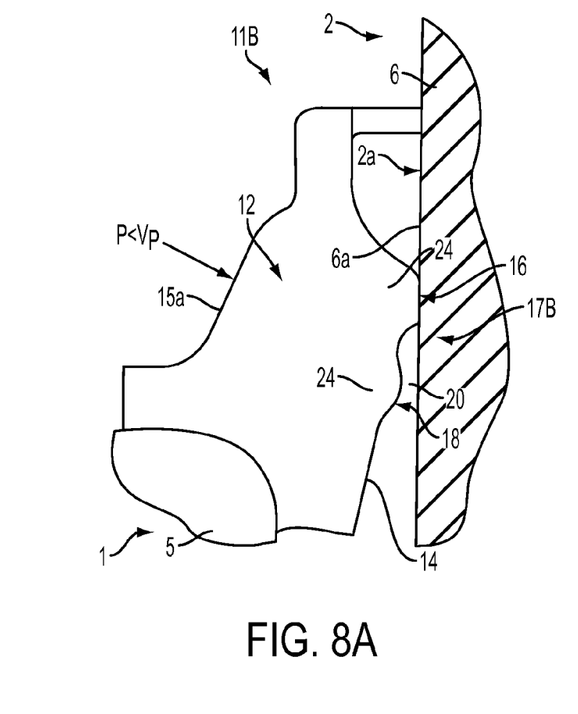
Figure 8B:
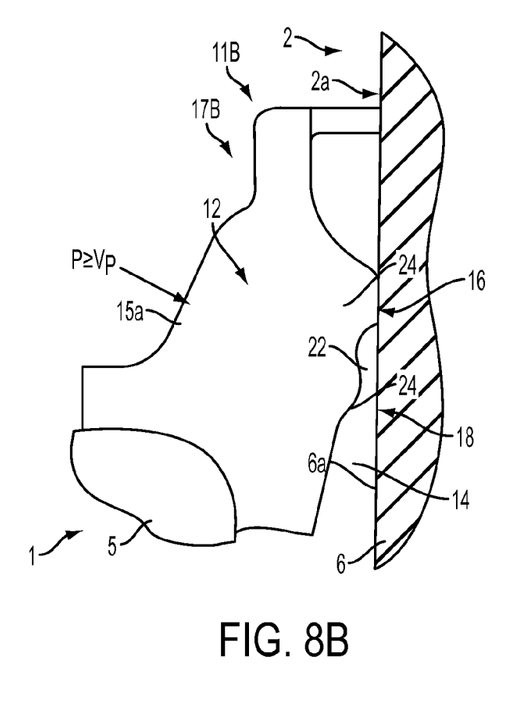

In a second construction shown in FIGS. 5 and 8, the seal 10 is formed as an inner seal 11B in which the two sealing portions 16, 18 extend generally radially inwardly from the body inner surface 14 and each have an inside diameter $D_{I1}$, $D_{I2}$, the first portion inside diameter $D_{I1}$ being lesser than the second portion inside diameter $D_{I2}$. The seal body 12 is configured to radially deflect such that, when the seal body 12 is exposed to pressure lesser P than a predetermined value $V_P$, only the first, fixed sealing portion 16 is sealingly engaged with the inner member outer surface 2a and the second, movable sealing portion 18 is spaced radially outwardly from the outer surface 2a, as depicted in FIG. 8A. However, when the seal body 12 is exposed to pressure P of at least the predetermined value $V_P$, the body 12 deflects generally radially inwardly such that both the first and second sealing portions 16, 18 are sealingly engaged with the inner member outer surface 2a. That is, pressure P acting on a drive surface section 15a of the outer circumferential surface 15 causes the seal body 12 to deflect radially inwardly when equal to or greater than the predetermined value $V_P$, thereby moving the second sealing portion 18 radially into engagement with the inner member outer surface 2a, as best shown in FIG. 8B.

In either construction 11A or 11B, the seal 10 has the benefit of reduced friction under relatively lower pressure conditions, as only the single sealing portion 16 is engaged with an actuator member surface 1a or 2a. Thus, the chance of the coupled actuator member 1, 2 becoming angled or "cocked" relative to the central axis 1a is substantially reduced. Additionally, the seal 10 has an increased sealing capacity provided by the two sealing portions 16, 18 under relatively higher pressure "operating" conditions.

Although each of the inner and outer seals 11A, 11B is described and depicted with a body 12 having a single first, fixed sealing portion 16 and a single second, movable sealing portion 18, the seal 10 may be formed with a plurality of first sealing portions 16 and/or a plurality of second sealing portions 18. For example, the seal body 12 may have one first/fixed sealing 16 portion and two second/movable sealing portions 18 located on either axial side of the first sealing portion 16. Further for example, the seal body 12 may include two (or more) axially spaced fixed sealing portions 16 and a single movable sealing portion 18 located axially adjacent to one of the fixed sealing portions 16. The present invention encompasses these and any other combination of first and second sealing portions 16, 18 as desirable or suitable for a particular sealing application.

Referring to FIGS. 1, 2, 9 and 10, in a first seal application, the outer member 1 is a housing 4 (e.g., a clutch drum) and the inner member 2 is a clutch actuator piston 5 linearly displaceable within the housing 4 generally along the central axis $A_C$. In the first seal application, the seal 10 is a first seal 17A formed as an outer seal 11A with the first and second sealing portions 16, 18 extending generally radially outwardly from the seal body outer surface 15. The two sealing portions 16, 18 are sealingly engageable with an inner surface 4a of the housing 4 and the seal body 12 at least partially disposed about the actuator piston 5 so as to couple the seal 10 with the piston 5.

As best shown in FIGS. 1, 2, 9 and 11, in a second seal application, the outer member 1 is a clutch actuator piston 5, the inner member 2 is a shaft 6, and the seal 10 is a second seal 17B formed as an inner seal 11B. In this application, the first and second sealing portions 16, 18 extend generally radially inwardly from the seal body inner surface 14 and are sealingly engageable with the shaft outer surface 6a, and the seal body 12 is at least partially disposed within a central bore 5b of the actuator piston 5 so as to be coupled therewith. Preferably, the shaft 6 is connected with the above-described housing 4, and most preferably, the housing 4 and the shaft 6 are integral portions of a "piston housing" of a clutch actuator assembly 3, as described below.

In a third seal application depicted in FIGS. 1, 3, 9 and 12, the outer member 1 is a clutch actuator piston 5 and the inner member 2 is a clutch balance piston 7. In the third seal application, the seal 10 is a third seal 17C formed as an outer seal 11A with the first and second sealing portions 16, 18 extending generally radially outwardly from the seal body outer surface 15. The two sealing portions 16, 18 are sealingly engageable with an inner surface 5c of the actuator piston 5, and the seal body 12 is at least partially disposed about the balance piston 7. Although the three above-described seal applications are preferably components of an actuator assembly 3 as mentioned above and described in further detail below, the seal 10 may be utilized in any other assembly requiring sealing between outer and inner members 1, 2.

Referring to FIGS. 7 and 8, in each seal construction, the two sealing portions 16, 18 are preferably formed such that a generally annular lubricant storage groove or chamber 22 is defined between the first and second sealing portions 16, 18. The storage groove 22 is configured to retain a quantity of lubricant for lubricating the sealing portions 16, 18.

Referring now to FIGS. 4-8, each one of the first and second sealing portions 16, 18 preferably includes a generally annular projection or bead 24 extending generally radially from a remainder of the body 12, such that the sealing portions 16, 18 are integral sections of the seal body 12. Each projection/bead 24 is preferably formed having radial cross-sections with an "undeflected profile" shaped generally semi-circular (as shown), generally triangular, or generally rectangular. In other words, each projection 24 has one of the noted shapes when the actuator member 1 or 2 to which the seal 10 is coupled is separate from the actuator assembly 3, such that both sealing portions 16, 18 are non-engaged with the contact/running surface 1a or 2a, and thus uncompressed or deflected, as best shown in FIGS. 4-6. Preferably, the projection/bead 24 of the first sealing portion 16 has the same shape as the projection 24 of the second sealing portion 18, and vice-versa, but the two sealing portions 16, 18 may have differently shaped beads/projections 24; for example, the first portion projection 24 may be semi-circular and the second portion projection 24 may be triangular. Further, although the projections 24 of the two sealing portions 16, 18 are preferably integral with the remainder of the seal body 12, each sealing portion 16, 18 may be provided by a separate insert (not shown) connected with the seal body 12, for example, a generally circular annular ring bonded to, groove-retained within, etc. the body 12.

Figure 1:
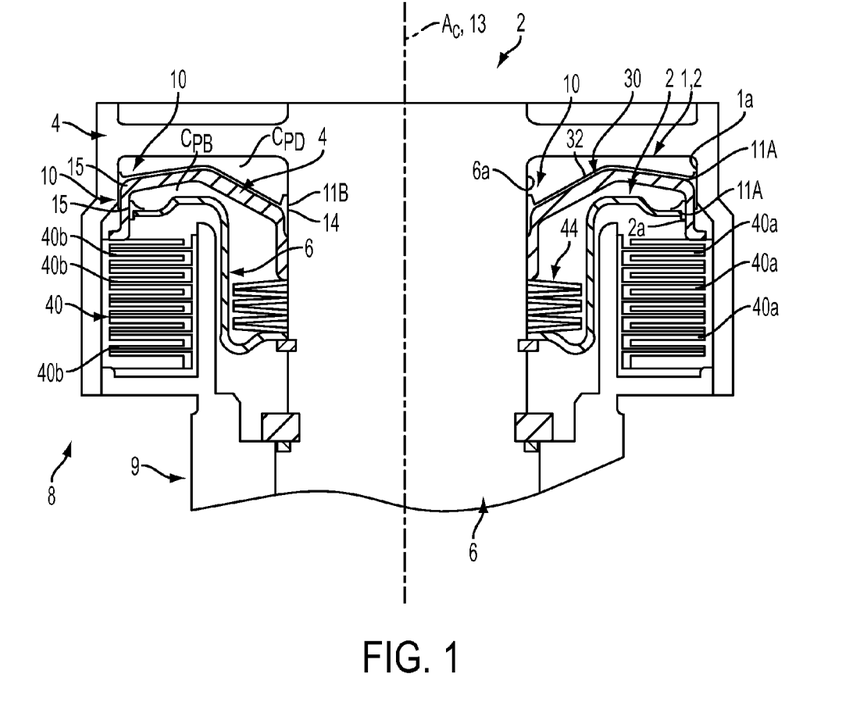
FIG. 1 is an axial cross-sectional view of an actuator assembly having three seals in accordance with the present invention.
Figure 2:
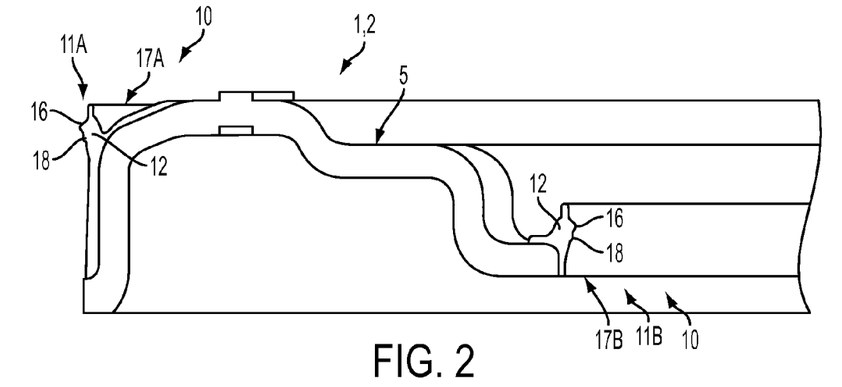
FIG. 2 is a broken-away, enlarged axial cross-sectional view of a clutch actuator piston of the actuator assembly, showing first and second seals.
Figure 3:
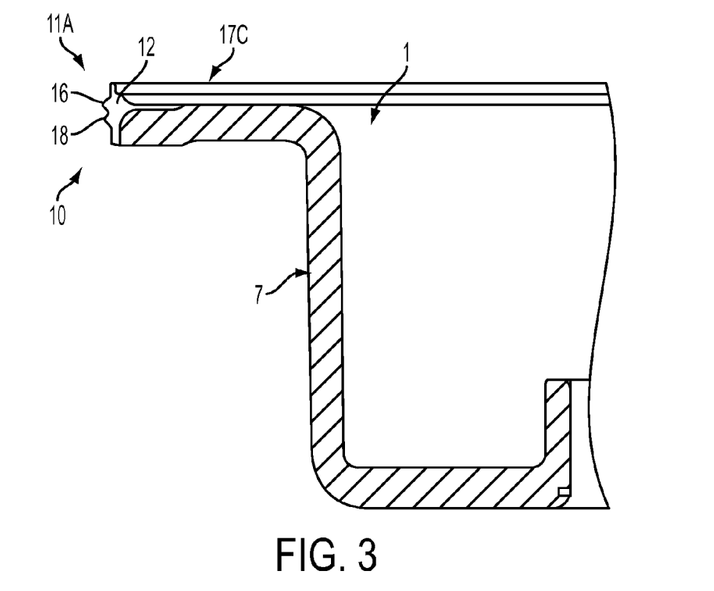
FIG. 3 is a broken-away, enlarged axial cross-sectional view of a clutch balance piston of the actuator assembly, showing a third seal.
Figure 9:
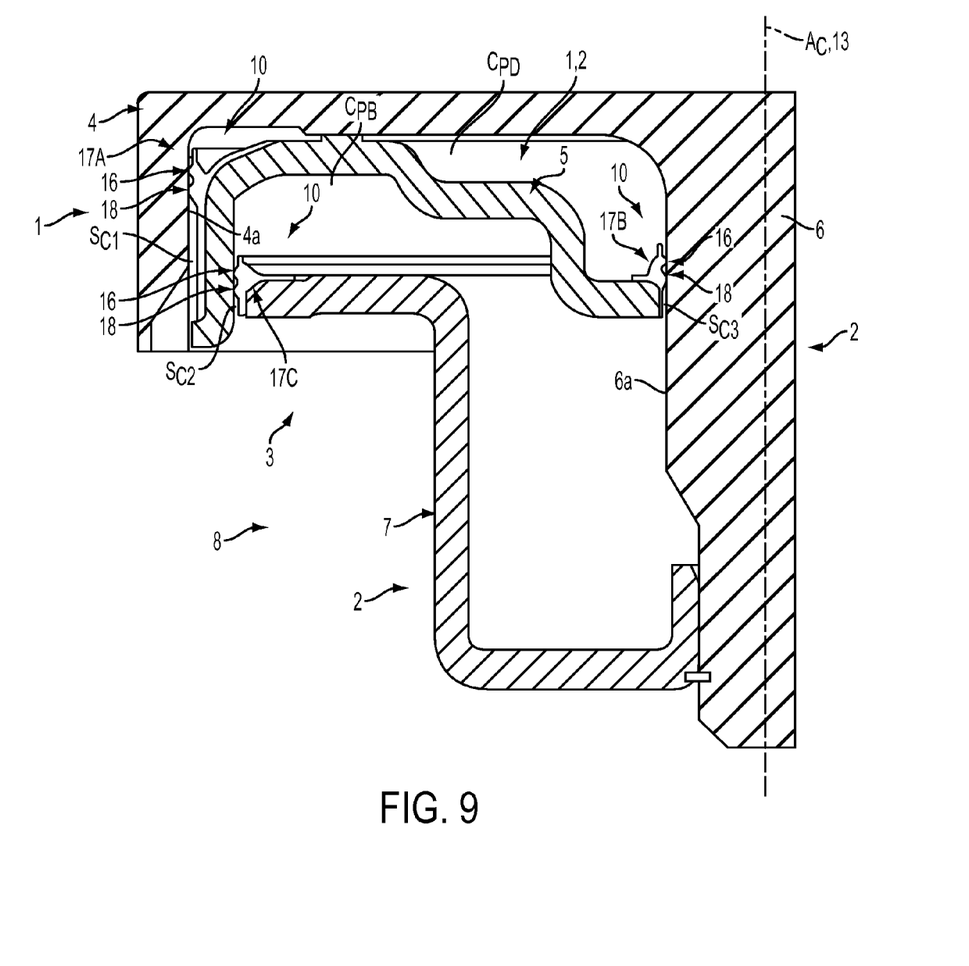
FIG. 9 is a broken-away, enlarged modified view of a portion of the actuator assembly of FIG. 1, showing the three seals in accordance with the present invention.
Figure 10:
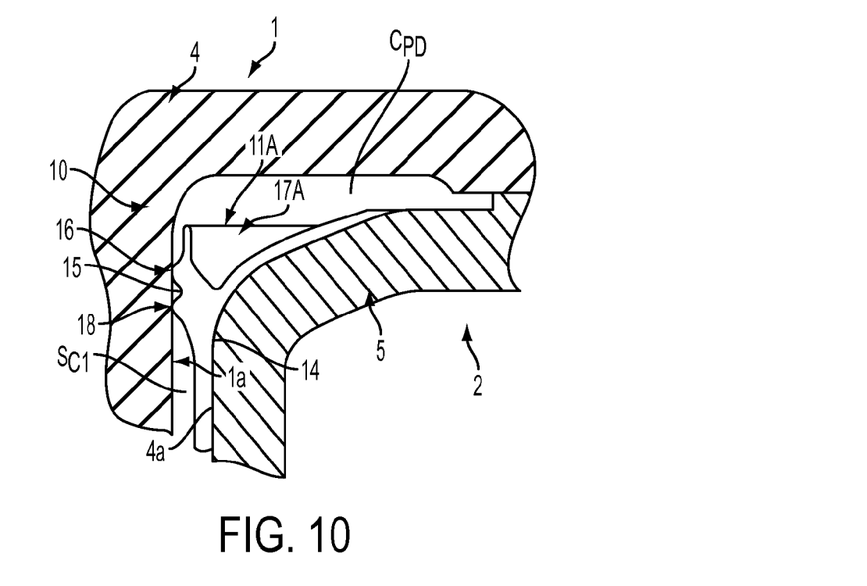
FIG. 10 is a broken-away, greatly enlarged view of a portion of FIG. 9, showing the outer, first seal between the clutch actuator piston and a housing.
Figure 11:
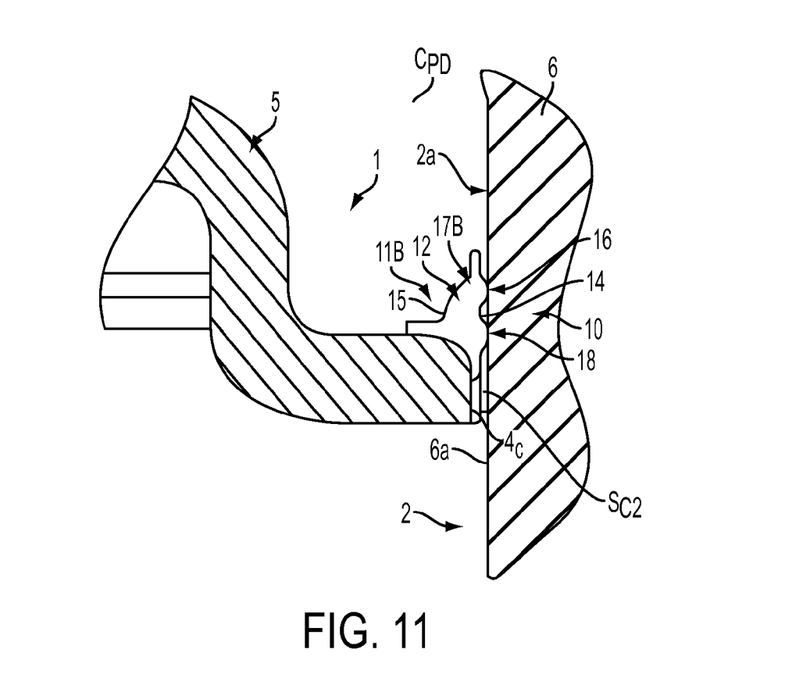
FIG. 11 is a broken-away, greatly enlarged view of another portion of FIG. 9, showing the inner, second seal between the clutch actuator piston and an input shaft.
Figure 12:
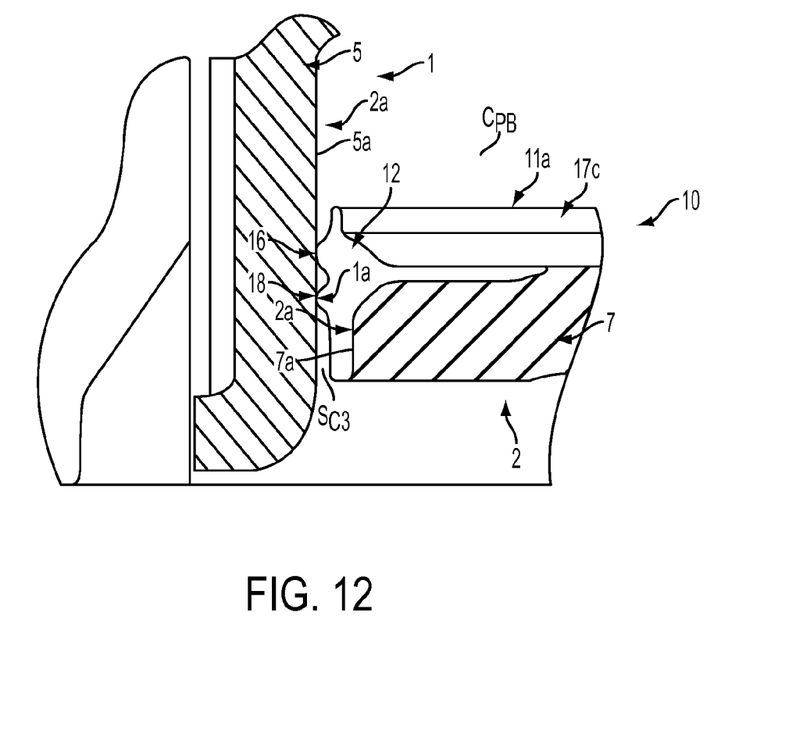
FIG. 12 is a broken-away, greatly enlarged view of yet another portion of FIG. 9, showing the outer, third seal between the balance piston and the clutch actuator piston.

Further, the seal body 12 and integral projections/beads 24 are preferably formed of a molded elastomeric material, such as natural or synthetic rubber, but may be formed of any other appropriate material. The seal body 12 is preferably bonded to the coupled one of the inner and outer members 1, 2, but may be connected to the member 1 or 2 by any appropriate means, such as by one or more fasteners, a clamp(s), an adhesive, frictional engagement, etc. Furthermore, each seal 10 may be provided as separate members, as shown in FIGS. 2 and 9, or may be provided as a seal assembly 30 including both an outer seal 11A and an inner seal 11B integrally connected by a central web portion 32, which may be bonded to the member 1 or 2 as a single unit, as depicted in FIG. 1.

Referring now to FIGS. 1-3 and 9-12, as discussed above, the seal 10 is preferably utilized in a clutch actuator assembly 3 that is incorporated into a clutch mechanism 8 for coupling the shaft 6 with an output member 9, such that the members 6, 9 are thereafter rotatable as a single unit. The actuator assembly 3 preferably includes the clutch actuator piston 5 slidably coupled with the shaft 6, the clutch balance piston 7 fixedly connected with the shaft 6 and a clutch pack 40. The clutch pack 40 has at least one and preferably a plurality of first clutching members 40a coupled with the shaft 6 (e.g., through the housing 4) and at least one and preferably a plurality of second clutching members 40b connected with the output member 9. The actuator piston 5 is configured to displace the first and second clutching members 40a, 40b into frictional engagement, thereby coupling the shaft 6 with the output member 9 such that the two components 6, 9 rotate as a unit about the central axis $A_C$. A first or "drive" pressure chamber $C_{PD}$ is defined between the actuator piston 5 and the housing 4 and a second or "balance" pressure chamber $C_{PB}$ is defined between the balance piston 7 and the actuator piston 5.

Further, a working fluid, most preferably automatic transmission fluid ("ATF"), is disposed within each of the pressure chambers $C_{PD}$, $C_{PB}$. The actuator piston 5 is linearly displaceable by fluid pressure in the drive pressure chamber $C_{PD}$ from an initial position to an operational position in which the piston 5 engages with the clutch pack 40 so as to couple the shaft 6 with the output member 9, and fluid within the balance chamber $C_{PB}$ balances the pressure in the drive chamber $C_{PD}$ to prevent unintended actuation of the piston 5. Furthermore, the clutch mechanism 8 also includes a biasing member 44, preferably one or more coil springs, configured to bias the actuator piston 5 toward the initial position, such that the piston 5 is returned to the initial position when the pressure is sufficiently reduced in the drive pressure chamber $C_{PD}$.

The above-described actuator assembly 3 preferably includes three seals 10 formed in accordance with the present invention; specifically, the first seal 17A, the second seal 17B, and the third seal 17C as discussed above and described hereinafter in further detail. The first seal 17A seals the clearance space $S_{C1}$ between the actuator piston 5 and the housing 4, the second seal 17B seals the clearance space $S_{C2}$ between the clutch actuator piston 5 and the shaft 6, and the third seal 17B seals the clearance space $S_{C3}$ between the clutch actuator piston 5 and the balance piston 7.

More specifically, with the first seal 17A, the seal body 12 is disposed at least partially on the actuating piston outer circumferential surface 5a and the sealing portions 16, 18 are engaged or engageable with, and slide axially within, an inner circumferential surface 4a of the housing 4. Working fluid in the drive chamber $C_{PD}$ exerts pressure on the first seal 17A, such that when the pressure P meets or exceeds the predetermined pressure value $V_P$, the body 12 deflects radially outwardly to engage the second sealing portion 18 with the housing inner surface 4a, thereby ensuring substantially complete sealing of the clearance space $S_{C1}$. With the second seal 17B, the body 12 is disposed on the clutch actuator piston 5 so as to be at least partially disposed within the bore 5b and the sealing portions 16, 18 are engaged/engageable with, and slide axially upon, the outer circumferential surface 6a of the shaft 6. The working fluid in the drive chamber $C_{PD}$ also exerts pressure on the second seal 17B so as to cause engagement of the second sealing portion 18 at pressures P at and above the predetermined pressure value $V_P$ to ensure substantial sealing of the second clearance space $S_{C2}$.

With the above-described structure, the first and second seals 17A, 17B are designed or configured such that only the first sealing portions 16 are engaged with the housing inner surface 4a or the shaft outer surface 6a during displacement of the actuator piston 5 in order to minimize or reduce friction, i.e., due to only a portion of the seal surface area being engaged with the surface 4a or 6a. Thus, the predetermined pressure value $V_P$ must be greater than the pressure that is required to displace the actuator piston 5, in other words, a pressure of sufficient magnitude to overcome friction between the seals 17A, 17B and the respective surfaces 5a, 6a and the force of the biasing member 44. With current commercial applications of the actuator assembly 3, a predetermined pressure value $V_P$ between 15 psi and 25 psi is sufficiently above the required pressure to displace the piston 5, such that only the first sealing portion(s) 16 are engaged during piston displacement, but provides an adequately low threshold for engagement of both sealing portions 16, 18 prior to the development of a pressure that could cause extrusion or other failure of the seal 10. However, the predetermined pressure value $V_P$ can be any other value or range of values depending on the specific construction of a particular seal 10, as long as the seal 10 is capable of functioning as described in the present disclosure.

Further, with the third seal 17C, the seal body 12 is disposed on the balance piston outer circumferential surface 7a and the sealing portions 16, 18 are engaged/engageable with, and slide axially against, a first inner circumferential surface 5a of the actuator piston 5. Working fluid in the balance chamber $C_{PB}$ exerts pressure on the third seal 17C such that the second sealing portion 18 engages the actuator piston inner surface 5a at pressures above the predetermined pressure value $V_P$ to thereby ensure complete sealing of the third clearance space $S_{C3}$. Similarly to the seals 17A, 17B as described above, the third seal 17C is designed/configured such that only the first sealing portion(s) 16 are engaged with the piston inner surface 5a during displacement of the actuator piston 5 (the balance piston 7 being axially stationary) in order to minimize or reduce friction. Since relative axial displacement of the actuator piston 5 must occur when the members 40a of the clutch pack 40 have disengaged and the shaft 6 is still rotating, the second sealing portion(s) 18 of the third seal 17C must disengage at a relatively higher pressure (due to centrifugal forces) than that which initiates engagement of the second sealing portions 18 of the first and second seals 17A, 17B. As such, the predetermined pressure $V_P$ for the third seal 17 C in current commercial applications is preferably within the range of twenty pounds per square inch (20 psi) and thirty-five pounds per square inch (35 psi), but may be any other appropriate value or range of values. Further, the clutch actuator assembly 3 may be constructed without the balance piston 7 and therefore without the third seal 17C.

Each of the above-described three seals 17A, 17B, 17C preferably function in substantially the same manner, except that the first and third seals 17A, 17C are outer seals 11A that deflect radially outwardly under fluid pressure P, whereas the second seal 17B is an inner seal 11B which deflects radially inwardly under fluid pressure P. Further, the first and second seals 17A, 17B are preferably formed so as to radially deflect at about the same predetermined value of fluid pressure P. However, all of the seals 17A, 17B, and 17C may alternatively be constructed so as to deflect at different predetermined pressure values, to deflect at different points in the operation cycle of the clutch assembly 8, and/or to deflect at a pressure that substantially varies from those pressure values discussed above.

Although the seal 10 of the present invention is preferably utilized in a clutch actuator assembly, the seal 10 may be used in any other appropriate application for sealing the clearance space between inner and outer members 1, 2. Also, it will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A seal assembly for sealing a space between an inner member and an outer member disposed generally coaxially about a central axis, the outer member having an inner surface and the inner member having an outer surface, at least one of the two members being linearly displaceable relative to the other member generally along the axis, the seal assembly comprising:

a generally annular seal body with a centerline, the seal body being coupled with one of the inner and outer members and disposed at least partially between the two members such that the centerline is generally collinear with the axis, the seal body having inner and outer circumferential surfaces extending about the centerline and first and second generally annular sealing portions spaced axially apart generally along the centerline and extending circumferentially about the centerline, and one of:

the two sealing portions extend generally radially outwardly from the seal body outer surface and each have an outside diameter, the first portion outside diameter being greater than the second portion outside diameter and the second portion outside diameter being sized such that the second portion is spaced radially inwardly from the outer member inner surface when assembled within the outer member, and the seal body is configured to radially deflect such that the first sealing portion is sealingly engaged with the outer member inner surface and the second sealing portion is spaced radially inwardly from the outer member inner surface when the seal body is exposed to pressure lesser than a predetermined value and both the first and second sealing portions are sealingly engaged with the outer member inner surface when the seal body is exposed to pressure of at least the predetermined value; and the two sealing portions extend generally radially inwardly from the seal body inner surface and each have an inside diameter, the first portion inside diameter being lesser than the second portion inside diameter and the second portion inside diameter being sized such that the second portion is spaced radially outwardly from the inner member outer surface when assembled about the inner member, and the seal body is configured to radially deflect such that the first sealing portion is sealingly engaged with the inner member outer surface and the second sealing portion is spaced radially outwardly from the inner member outer surface when the seal body is exposed to pressure lesser than a predetermined value and both the first and second sealing portions are sealingly engaged with the inner member outer inner surface when the seal body is exposed to pressure of at least the predetermined value.

2. The seal assembly as recited in claim 1 wherein one of:
the inner member is a clutch actuator piston, the outer member is a housing, the first and second sealing portions extend generally radially outwardly from the seal body outer surface and are sealingly engageable with an inner surface of the housing, and the seal body is at least partially disposed about the actuator piston;
the inner member is a shaft, the outer member is a clutch actuator piston, the first and second sealing portions extend generally radially inwardly from the seal body inner surface and are sealingly engageable with an outer surface of the shaft, and the seal body is at least partially disposed within a central bore of the actuator piston; and
the inner member is a clutch balance piston, the outer member is a clutch actuator piston, the first and second sealing portions extend generally radially outwardly from the seal body outer surface and are sealingly engageable with an inner surface of the actuator piston, and the seal body is at least partially disposed about the balance piston.

3. The seal assembly as recited in claim 1 wherein a generally annular lubricant storage chamber is defined between the first and second sealing portions, the storage chamber being configured to contain a quantity of lubricant.

4. The seal assembly as recited in claim 1 wherein the predetermined value is within the range of about fifteen pounds per square inch and twenty-five pounds per square inch.

5. The seal assembly as recited in claim 1 wherein a pressure chamber is defined generally between the first and second members, the chamber being configured to contain a fluid and the seal body being exposed to pressure of the fluid within the chamber.

6. The seal assembly as recited in claim 5 wherein the seal body has a drive surface section exposable to pressure within the fluid chamber such that the pressure on the drive surface deflects the seal body radially to move the second sealing portion into sealing engagement with the one of the outer member inner surface and the inner member outer surface.

7. The seal assembly as recited in claim 1 wherein each sealing portion includes a generally annular projection extending generally radially from a remainder of the seal body, each projection having radial cross-sections with an undeflected profile shaped one of generally semi-circular, generally triangular and generally rectangular.

8. The seal assembly as recited in claim 1 wherein the seal body is formed of an elastomeric material.

9. The seal assembly as recited in claim 1 wherein the seal body is bonded to one of the inner and outer members.

10. The seal assembly as recited in claim 1 wherein at least one of the inner and outer members is rotatable about the central axis.

11. An actuator assembly comprising:
inner and outer members disposed coaxially about a central axis such that a clearance space is defined between the two members, one of the inner and outer members being a clutch actuator piston linearly displaceable generally along the axis relative to the other one of the inner and outer members; and
a seal for sealing the clearance space, the seal including a generally annular seal body with a centerline, the seal body being coupled with one of the inner and outer members and disposed at least partially between the two members such that the centerline is generally collinear with the axis, the seal body having inner and outer circumferential surfaces extending about the centerline and first and second generally annular sealing portions spaced axially apart generally along the centerline and extending circumferentially about the centerline, and one of:
the two sealing portions extend generally radially outwardly from the seal body outer surface and each have an outside diameter, the first portion outside diameter being greater than the second portion outside diameter and the second portion outside diameter being sized such that the second portion is spaced radially inwardly from the outer member inner surface when assembled within the outer member, and the seal body is configured to radially deflect such that the first sealing portion is sealingly engaged with the outer member inner surface and the second sealing portion is spaced radially inwardly from the outer member inner surface when the seal body is exposed to pressure lesser than a predetermined value and both the first and second sealing portions are sealingly engaged with the outer member inner surface when the seal body is exposed to pressure of at least the predetermined value; and
the two sealing portions extend generally radially inwardly from the seal body inner surface and each have an inside diameter, the first portion inside diameter being lesser than the second portion inside diameter and the second portion inside diameter being sized such that the second portion is spaced radially outwardly from the inner member outer surface when assembled about the inner member, and the seal body is configured to radially deflect such that the first sealing portion is sealingly engaged with the inner member outer surface and the second sealing portion is spaced radially outwardly from the inner member outer surface when the seal body is exposed to pressure lesser than a predetermined value and both the first and second sealing portions are sealingly engaged with the inner member outer inner surface when the seal body is exposed to pressure of at least the predetermined value.

12. The actuator assembly as recited in claim 11 wherein one of:
the inner member is the clutch actuator piston and the outer member is a housing having an inner circumferential surface, the seal body being coupled with the actuator piston and the first and second sealing portions being engageable with the housing inner circumferential surface;
the inner member is a clutch balance piston and the outer member is the clutch actuator piston, the actuator piston having and inner circumferential surface, and the seal body being coupled with the balance piston and the first and second sealing portions being engageable with the clutch piston inner circumferential surface; and
the inner member is a shaft having an outer circumferential surface and the outer member is the clutch actuator piston, the seal body being coupled with the actuator piston and the first and second sealing portions being engageable with the shaft outer surface.

13. The actuator assembly as recited in claim 11 wherein a pressure chamber is defined generally between the inner and outer members, the actuator assembly further comprises a working fluid disposed within the pressure chamber, and the seal body is exposed to pressure of the working fluid within the chamber such that the seal body deflects radially when the working fluid pressure is at least the predetermined value.

14. The actuator assembly as recited in claim 11 wherein the predetermined pressure value is within the range of about fifteen pounds per square inch and twenty-five pounds per square inch.

15. The actuator assembly as recited in claim 11 wherein the seal body is formed of an elastomeric material and is bonded to one of the inner and outer members.

16. The actuator assembly as recited in claim 11 wherein:
a generally annular lubrication gap is defined generally between the second sealing portion and a proximal one of the outer member inner surface and the inner member outer surface when the seal body is exposed to pressure lesser than the predetermined value; and
a generally annular lubricant storage chamber is defined between the first and second sealing portions when the seal body is exposed to pressure of at least the predetermined value, the storage chamber being configured to contain a quantity of lubricant.

17. The actuator assembly as recited in claim 11 wherein:
the outer member is the clutch actuator piston displaceable along the central axis between an initial position and an operational position, the inner member is a shaft having an outer circumferential surface, the sealing portions extend generally radially inwardly from the seal body inner surface and are engageable with the shaft outer surface; and
the actuator assembly further comprises a biasing member configured to bias the actuator piston toward the initial position.

18. A seal assembly for sealing a space between an inner member and an outer member disposed generally coaxially about a central axis, the outer member having an inner surface and the inner member having an outer surface, at least one of the two members being linearly displaceable relative to the other member generally along the axis, the seal assembly comprising:
a generally annular seal body with a centerline, the seal body being coupled with one of the inner and outer members and disposed at least partially between the two members such that the centerline is generally collinear with the axis, the seal body having inner and outer circumferential surfaces extending about the centerline and first and second generally annular sealing portions spaced axially apart generally along the centerline and extending circumferentially about the centerline, the two sealing portions extending generally radially outwardly from the seal body outer surface and each having an outside diameter, the first portion outside diameter being greater than the second portion outside diameter and the second portion outside diameter being sized such that the second portion is spaced radially inwardly from the outer member inner surface when assembled within the outer member, the seal body being configured to radially deflect such that the first sealing portion is sealingly engaged with the outer member inner surface and the second sealing portion is spaced radially inwardly from the outer member inner surface when the seal body is exposed to pressure lesser than a predetermined value and both the first and second sealing portions are sealingly engaged with the outer member inner surface when the seal body is exposed to pressure of at least the predetermined value.

19. A seal assembly for sealing a space between an inner member and an outer member disposed generally coaxially about a central axis, the outer member having an inner surface and the inner member having an outer surface, at least one of the two members being linearly displaceable relative to the other member generally along the axis, the seal assembly comprising:
a generally annular seal body with a centerline, the seal body being coupled with one of the inner and outer members and disposed at least partially between the two members such that the centerline is generally collinear with the axis, the body having inner and outer circumferential surfaces extending about the centerline and first and second generally annular sealing portions spaced axially apart generally along the centerline and extending circumferentially about the centerline, the two sealing portions extending generally radially inwardly from the seal body inner surface and each having an inside diameter and the second portion inside diameter being sized such that the second portion is spaced radially outwardly from the inner member outer surface when assembled about the inner member, the first portion inside diameter being lesser than the second portion inside diameter, the seal body being configured to radially deflect such that the first sealing portion is sealingly engaged with the inner member outer surface and the second sealing portion is spaced radially outwardly from the inner member outer surface when the seal body is exposed to pressure lesser than a predetermined value and both the first and second sealing portions are sealingly engaged with the inner member outer inner surface when the seal body is exposed to pressure of at least the predetermined value.

* * * * *